(12) United States Patent
Chiu

(10) Patent No.: US 6,396,178 B1
(45) Date of Patent: May 28, 2002

(54) WHEEL WITH A GENERATOR

(75) Inventor: Chun-Chen Chiu, Taichung Hsien (TW)

(73) Assignee: Meng-Yu Liu, Taichung Hsien (TW)

( * ) Notice: Subject to any disclaimer, the term of this patent is extended or adjusted under 35 U.S.C. 154(b) by 0 days.

(21) Appl. No.: 09/753,606

(22) Filed: Jan. 4, 2001

(51) Int. Cl.[7] ............................................. H02K 7/00
(52) U.S. Cl. .................. 310/67 R; 310/67 A; 310/75 C
(58) Field of Search ................................ 310/67 R, 71, 310/90, 67 A, 75 C, 75 B, 168

(56) References Cited

U.S. PATENT DOCUMENTS

| | | | | |
|---|---|---|---|---|
| 3,569,804 A | * | 3/1971 | Studer | 310/168 |
| 5,115,159 A | * | 5/1992 | Takamiya et al. | 310/67 A |
| 6,215,220 B1 | * | 4/2001 | Cooke | 310/136 |
| 6,337,528 B1 | * | 1/2002 | Jung | 310/168 |

* cited by examiner

Primary Examiner—Nestor Ramirez
Assistant Examiner—Thanh Lam
(74) Attorney, Agent, or Firm—Rosenberg, Klein & Lee

(57) ABSTRACT

A wheel has two wheel halves, a generator, two bearings and two metal rings. The wheel halves are detachably connected to each other. The generator is composed of an annular coil seat and an annular permanent magnet. The coil seat is securely mounted between the wheel halves and has a winding wound around the coil seat. The permanent magnet is rotatably mounted between the wheel halves. Each bearing is received in one of the wheel halves and electrically connects with one end of the winding. Each ring is securely attached to one of the wheel halves to abut the bearing. Consequently, the coil seat will rotate with the wheel bodies and relative to the permanent magnet and generate electricity. The electricity will be transmitted to a lighting device or a sounding device. The enjoyment of a roller skate or a skateboard with the wheel is improved.

11 Claims, 4 Drawing Sheets

WHEEL WITH A GENERATOR

BACKGROUND OF THE INVENTION

1. Field of the Invention

The present invention relates to a wheel, and more particularly to a wheel with a generator for a roller skate or a skateboard.

2. Description of Related Art

With reference to FIG. 4, a conventional roller skate comprises a frame (60), multiple wheels (62) and a shoe (64). The wheels (62) are rotatably mounted on the bottom of the frame (60) and arranged in a row. The shoe (64) is attached to the top of the frame (64) for a person to wear. The conventional wheel (62) for a roller skate is made of plastic or the like. The conventional wheel (62) cannot provide sound or light to the roller skate. The fun of using the roller skate is limited.

To overcome the shortcomings, the present invention tends to provide a wheel with a generator to mitigate or obviate the aforementioned problems.

SUMMARY OF THE INVENTION

The main objective of the invention is to provide a wheel with a generator to generate electricity when the wheel rotates. The wheel has two halves, a generator, two bearings and two metal rings. The wheel halves are detachably connected to each other. The generator is mounted between the wheel halves and composed of an annular coil seat and an annular permanent magnet. The coil seat is securely mounted between the wheel halves and has a winding wound around the coil seat. The permanent magnet is rotatably mounted between the wheel halves and in the coil seat. A gap is defined between the outer periphery of the permanent magnet and the inner periphery of the coil seat. Each bearing is received in one of the wheel halves and electrically connects with one end of the winding. A metal ring is securely attached to each wheel half to abut the bearing mounted in the wheel half. With such an arrangement, the coil seat will rotate with the bodies relative to the permanent magnet, and electricity is generated. The electricity will be transmitted to a lighting device or a sounding device. The fun of using a roller skate or a skateboard with the wheel generator is improved.

Other objects, advantages and novel features of the invention will become more apparent from the following detailed description when taken in conjunction with the accompanying drawings.

DETAILED DESCRIPTION OF PREFERRED EMBODIMENT

Figure 1:
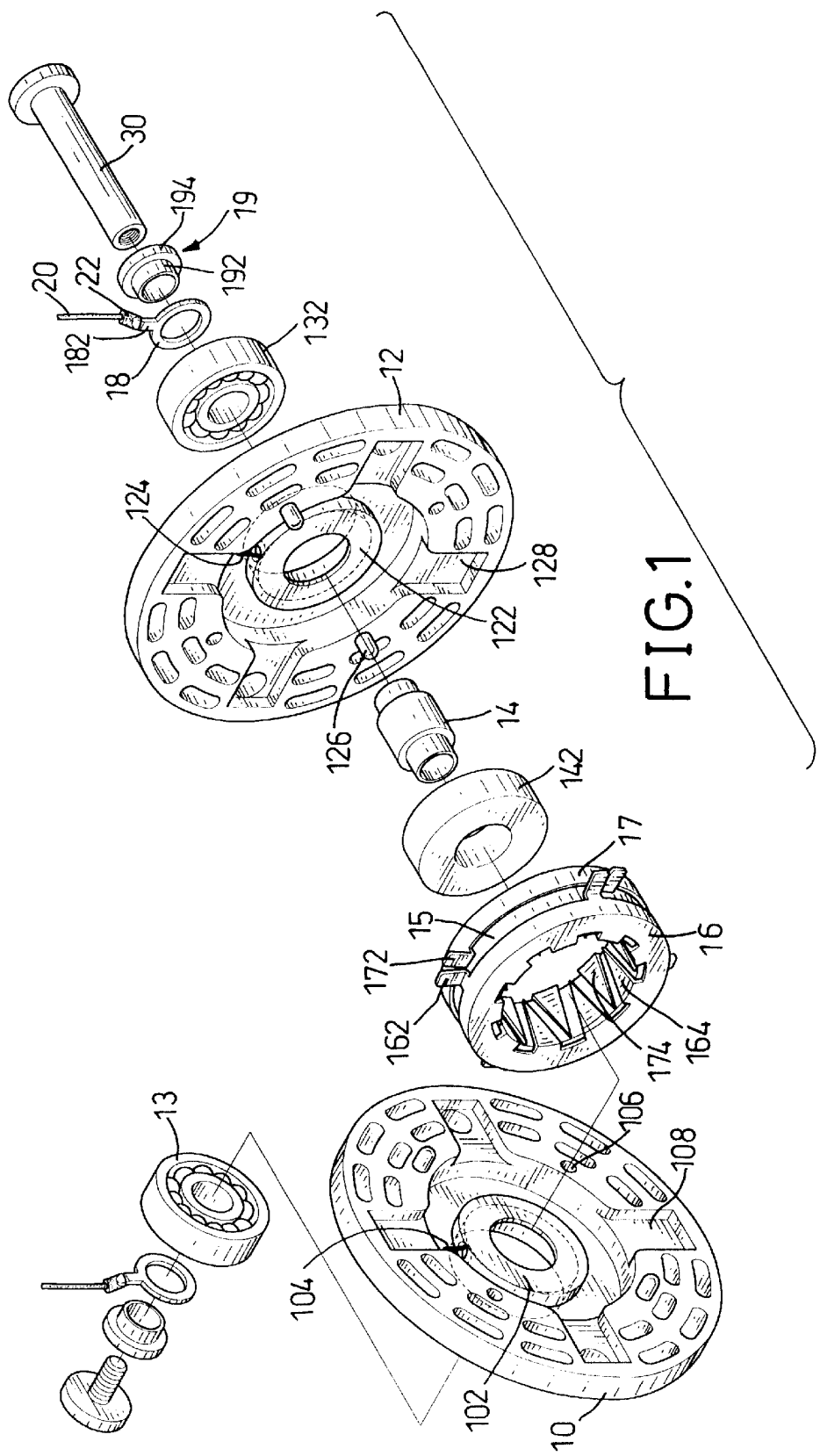
FIG. 1 is an exploded perspective view of a wheel with a generator in accordance with the present invention.
Figure 2:
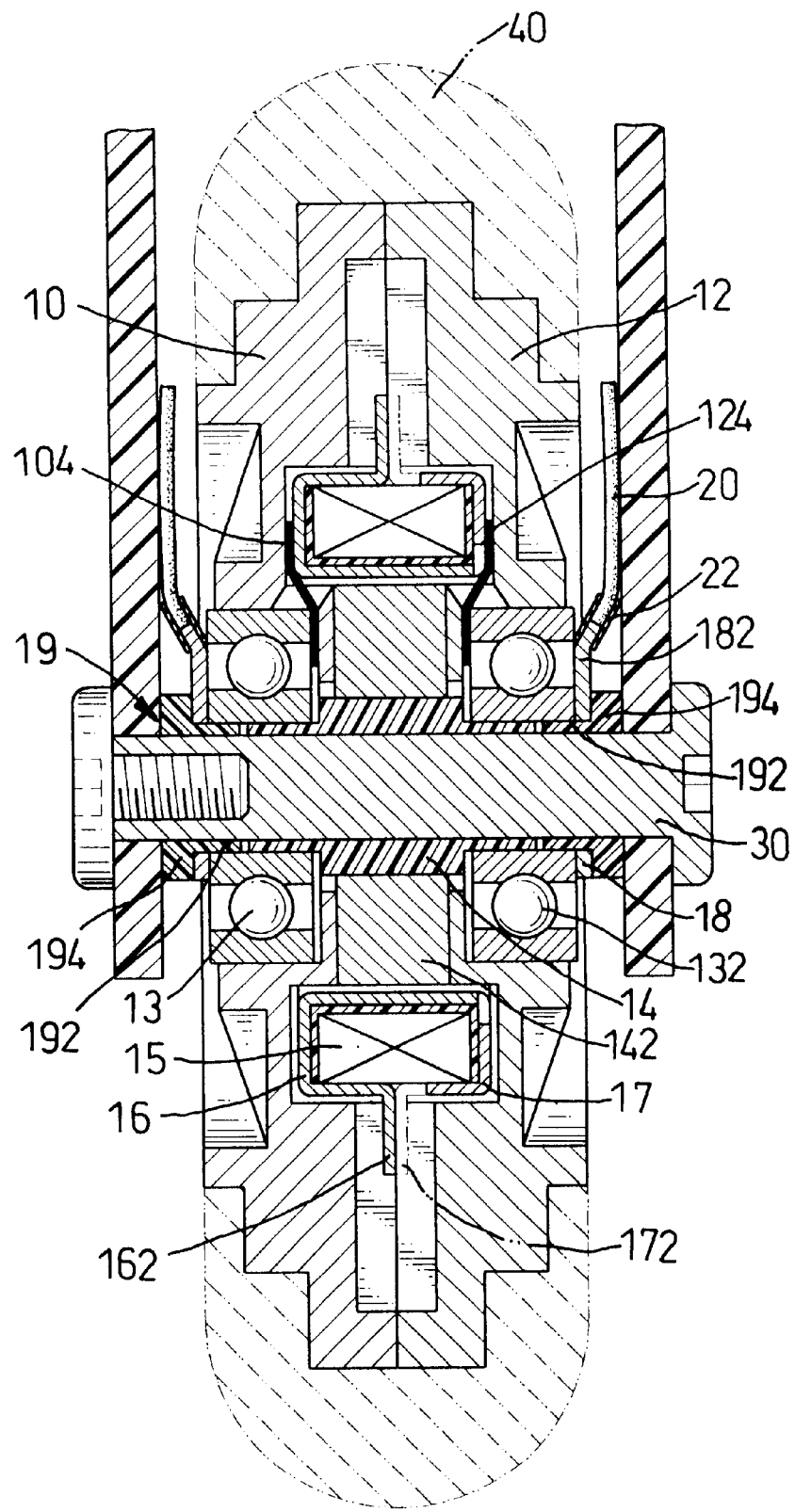
FIG. 2 is a cross sectional front plan view of the wheel in FIG. 1.

With reference to FIGS. 1 and 2, a wheel for in accordance with the present invention comprises two wheel halves (10, 12), a generator, two bearings (13,132) and two metal rings (18). The wheel is mounted on a roller skate, a skateboard or the like. Both of the bodies (10, 12) are circular. One of the wheel halves (10) has multiple holes (106) defined in the body (10). The other wheel half (12) has Stubs (126) corresponding to the holes (106) extending from the wheel half (12) and engaging the corresponding holes (106) in the opposite wheel half (10). Consequently, the wheel halves (10, 12) are securely connected to each other by the engagements between the holes (106) and the stubs (126) such that they rotate as a single element. A tire (40) is mounted around the wheel halves (10, 12) to enclose the outer peripheries of the wheel halves (10, 12). Accordingly, the wheel halves (10, 12) will not unintentionally disengage from each other because the tire (40) securely holds the wheel halves (10, 12) together.

Figure 3:
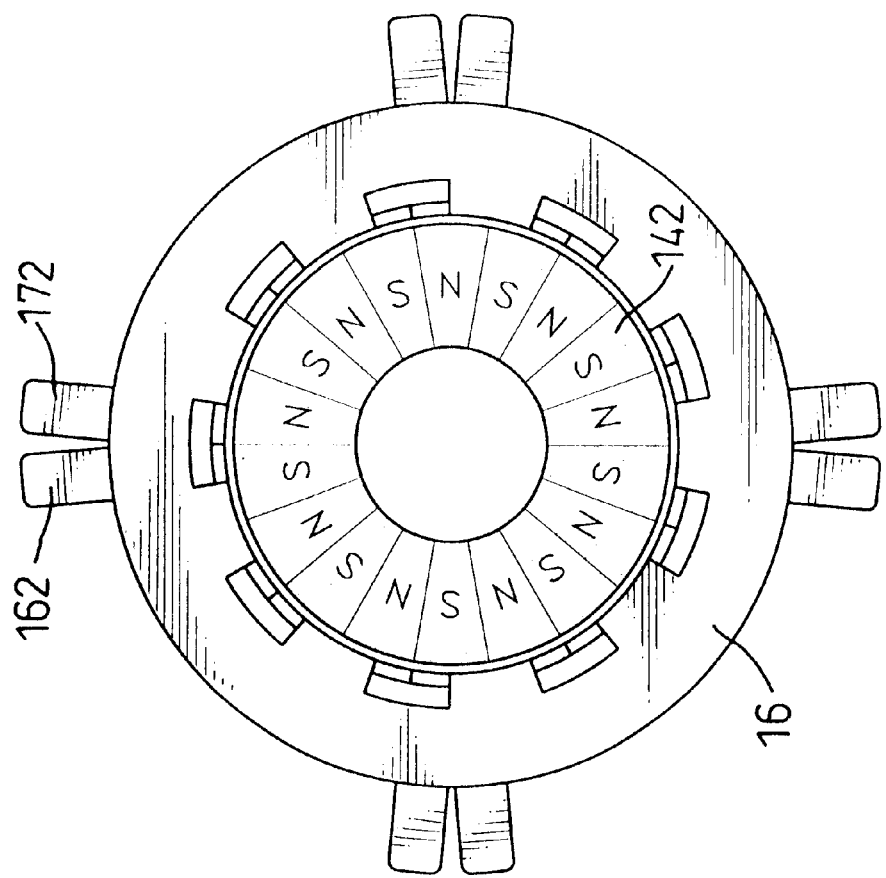
FIG. 3 is a side plan view of the coil seat and the permanent magnet in FIG. 1.
Figure 4:
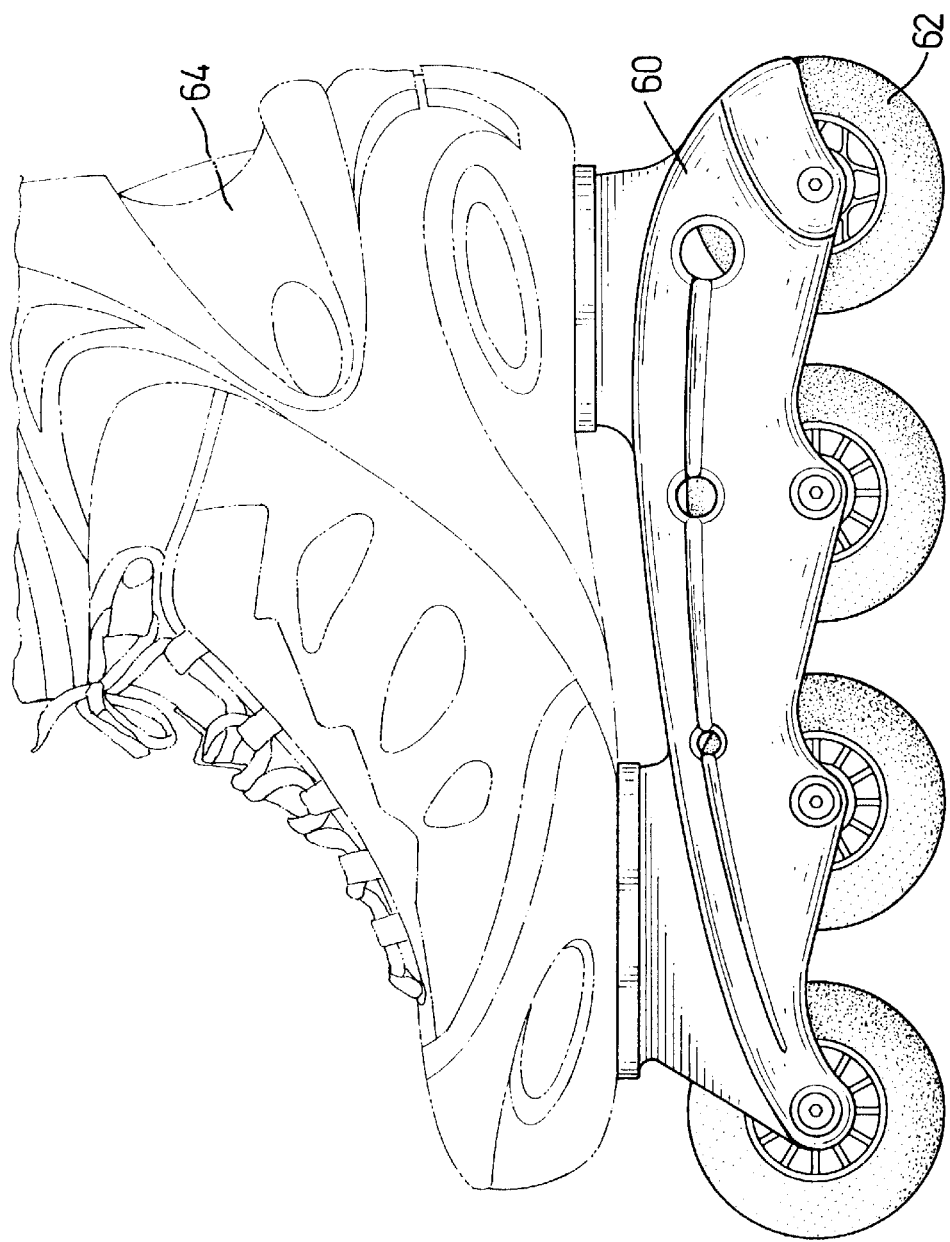
FIG. 4 is a side plan view of a roller skate in accordance with the prior art.

With reference to FIGS. 1 to 3, the generator is mounted between the wheel halves (10, 12) and composed of an annular coil seat (15) and an annular permanent magnet (142). The annular coil seat (15) is securely mounted between the wheel halves (10, 12) and has a winding (not shown) wound around the coil seat (15). The annular permanent magnet (142) is rotatably mounted between the wheel halves (10, 12) in the center of the coil seat (15). A gap is defined between the outer periphery of the permanent magnet (142) and the inner periphery of the coil seat (15). The magnetic poles of the permanent magnet (142) are alternately arranged around the permanent magnet (142).

A metal cover (16, 17) is securely attached to each side of the coil seat (15) and connected to one end of the winding. Multiple teeth (164, 174) extend perpendicular from the inner periphery of each cover (16, 17) parallel to the axis of rotation and abut the inner periphery of the coil seat (15), such that each cover (16, 17) will securely attach to one side of the coil seat (15). Several tabs (162, 172) are formed on the outer periphery of each cover (16, 17). One of the tabs (162, 172) is connected to one end of the winding. Several recesses (108, 128) are defined in each wheel half(10, 12) to receive one of the tabs (162, 172). Consequently, the coil seat (15) will rotate with the wheel halves (10, 12) due to the engagement between each tab (162, 172) and the corresponding recess (108, 128).

The bearings (13, 132) are respectively mounted in each wheel half (10, 12). A base (102, 122) is defined in each wheel half (10,12) to mount one of the bearings (13, 132). A wire (104, 124) extends into the base (102, 122) of each wheel half (10, 12). Two ends of the wire (104, 124) respectively abut the bearing (13, 132) and one of the covers (16, 17), such that each bearing (13, 132) is electrically connected with one end of the winding through the metal cover (16, 17) and the wire (104, 124). A nonconductive sleeve (14) is mounted between the bearings (13, 132), and each end of the nonconductive sleeve (14) extends into one of the bearings (13, 132). The permanent magnet (142) is pressed onto the sleeve (14) between the bearings (13, 132), such that the permanent magnet (142) will rotate with the sleeve (14) and relative to the wheel halves (10, 12).

A metal ring (18) is securely attached to each wheel half (10,12). Each ring (18) abuts the bearing (13, 132) mounted in the wheel half (10, 12) to which the ring (18) attaches. A cap (19) is attached to each wheel half (10, 12) to securely hold each ring (18) on the wheel half (10, 12). Each cap (19) includes a tube (192) extending into the ring (18) and the bearing (13,132) and a flange (194) abutting the ring (18). A tab (182) is formed on an outer periphery of each ring (18). One end of a wire (20) is connected to the tab (182) of each ring (18). The other end of the wire (20) is connected to a lighting device or a sounding device, wherein the lighting device or the sounding device can be mounted on the frame or the shoe of a roller skate or the board of a skateboard. A sheath (22) is mounted on the tab (182) to enclose the conjunction between the tab (182) and the wire (20). The sheath (22) provides a protection to the junction between the tab (182) and the wire (20).

In use, the wheel in accordance with the present invention replaces one of the conventional wheels of a roller skate or a skateboard. The wheel is rotatably mounted on the frame of the roller skate or the board of the skateboard with an axle (30). Accordingly, when the roller skate or the skateboard is in use and the wheel rotates, the coil seat (15) will rotate with the wheel halves (10,12) and relative to the permanent magnet (142). The winding wound in the coil seat (15) will cut through the magnetic line of flux of the permanent magnet (142) and generate electricity. The electricity will be transmitted to the lighting device or the sounding device through the cover (16, 17), the wire (104, 124) connected to the cover (16, 17), the bearing (13, 132), the ring (18) and the wire (20) connected to the ring (18), and the lighting device or the sounding device will work. Consequently, the enjoyment of using the roller skate or the skateboard is improved. In addition, the lighting device or the sounding device provides a warning effect to other people at night. The safety of using the roller skate or the skateboard is also improved.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wheel comprising:

two wheel halves detachably connected to each other;

a generator received between the wheel halves and composed of:

an annular coil seat securely mounted between the wheel halves and having a winding wound around the coil seat;

an annular permanent magnet rotatably mounted between the wheel halves and in a center of the coil seat; and a gap defined between an outer periphery of the permanent magnet and an inner periphery of the coil seat;

a bearing received in each wheel half and electrically connecting with one end of the winding; and a metal ring securely attached to each wheel half and abutting the bearing received in the wheel half to which the metal ring attaches.

2. The wheel as claimed in claim 1, wherein a metal cover is securely attached to each side of the coil seat and connected with one end of the winding;

a base is defined in each wheel half to hold one of the bearings; and a wire extends into the base and has two ends respectively abutting the bearing mounted in the base into which the wire extends and one of the covers.

3. The wheel as claimed in claim 2, wherein tabs are formed on an outer periphery of each cover; and each tab is connected to one end of the winding.

4. The wheel as claimed in claim 3, wherein recesses are defined in each wheel half to receive one of the tabs.

5. The wheel as claimed in claim 2, wherein multiple teeth extend perpendicularly from an inner periphery of each cover and abut the inner periphery of the coil seat.

6. The wheel as claimed in claim 1, wherein a nonconductive sleeve is mounted between the bearings and has two ends respectively extending into one of the bearings; and the permanent magnet is pressed onto the nonconductive sleeve between the bearings.

7. The wheel as claimed in claim 1, wherein one of the wheel halves has multiple holes defined in the wheel half; and the other wheel half has stubs extending from the wheel half and engaging the holes.

8. The wheel as claimed in claim 1, wherein a tab is formed on an outer periphery of each metal ring; and a wire is connected to the tab of each metal ring.

9. The wheel as claimed in claim 8, wherein a sheath is mounted on the tab of each ring to enclose the junction between the tab and the wire.

10. The wheel as claimed in claim 8, wherein a cap is attached to each wheel half to securely hold each ring against the wheel half; and the cap includes a tube extending into the ring and the bearing and a flange abutting the ring.

11. The wheel as claimed in claim 1 further comprising a tire mounted around the wheel halves to enclose the outer peripheries of the wheel halves.

* * * * *